United States Patent
Esser

(10) Patent No.: US 8,746,441 B2
(45) Date of Patent: Jun. 10, 2014

(54) CONVEYOR FOR ELONGATED WORKPIECES

(75) Inventor: Karl-Josef Esser, Moenchengladbach (DE)

(73) Assignee: SMS Meer GmbH, Moenchengladbach (DE)

(*) Notice: Subject to any disclaimer, the term of this patent is extended or adjusted under 35 U.S.C. 154(b) by 0 days.

(21) Appl. No.: 13/817,315

(22) PCT Filed: Feb. 4, 2012

(86) PCT No.: PCT/EP2012/000504
§ 371 (c)(1),
(2), (4) Date: Feb. 15, 2013

(87) PCT Pub. No.: WO2012/136289
PCT Pub. Date: Oct. 11, 2012

(65) Prior Publication Data
US 2013/0284564 A1    Oct. 31, 2013

(30) Foreign Application Priority Data
Apr. 6, 2011   (DE) .......................... 10 2011 016 199

(51) Int. Cl.
*B65G 25/02*   (2006.01)
*B23Q 7/00*    (2006.01)

(52) U.S. Cl.
CPC ............ *B65G 25/02* (2013.01); *B65G 2812/09* (2013.01); *B23Q 7/00* (2013.01)
USPC ...................................... 198/776; 198/774.3

(58) Field of Classification Search
CPC .............................. B65G 25/02; B65G 2812/09
USPC .......... 198/773, 774.1, 775, 776, 774.3, 468.6
See application file for complete search history.

(56) References Cited

U.S. PATENT DOCUMENTS

| 666,865 A | * | 1/1901 | Helfensteller | ................ 198/776 |
| 1,028,411 A | * | 6/1912 | Wieghard | ..................... 222/404 |

(Continued)

*Primary Examiner* — Mark A Deuble
(74) *Attorney, Agent, or Firm* — Andrew Wilford

(57) ABSTRACT

The invention relates to a transport device (1) for workpieces (2) which have a longitudinal axis (L), in particular for pipes or for round stock, by way of which transport device (1) the workpieces (2) can be conveyed from a first location (3) to a second location (4) in a conveying direction (F) transversely with respect to their longitudinal axis (L), wherein the transport device (1) has: at least two stationary storage carriers (5, 6) which are arranged spaced apart in the conveying direction (F) for the intermediate storage of the workpieces (2) to be conveyed, at least one first conveying rack (7) with a number of storage surfaces (8) which are spaced apart in a conveying direction (F) for the workpieces (2), at least two drive shafts (9, 10) which are arranged parallel to one another and are driven synchronously, and at least two first rocker arms (11, 12), wherein each first rocker arm (11, 12) is connected fixedly to a drive shaft (9, 10) so as to rotate with it and in an articulated manner to the first conveying rack (7). In order to achieve a shortened transport time and therefore higher productivity of the system, the proposed transport device is characterized by at least one second conveying rack (13) having at least one storage surface (14) for the workpieces (2), wherein the second conveying rack (13) is connected via two second rocker arms (15, 16) to the drive shafts (9, 10), wherein each second rocker arm (15, 16) is connected fixedly to a drive shaft (9, 10) so as to rotate with it and in an articulated manner to the second conveying rack (13), and wherein the second rocker arms (15, 16) are arranged on the respective drive shaft (9, 10) with an offset angle (a) in the circumferential direction relative to the first rocker arms (11, 12).

10 Claims, 5 Drawing Sheets

(56) References Cited

U.S. PATENT DOCUMENTS

| | | | |
|---|---|---|---|
| 2,957,573 A * | 10/1960 | Eyster | 198/776 |
| 3,722,662 A * | 3/1973 | Wakabayashi et al. | 134/134 |
| 4,286,422 A * | 9/1981 | Howe, Jr. | 53/473 |
| 4,382,503 A | 5/1983 | Akitav | |
| 5,086,912 A * | 2/1992 | Howden, Jr. | 198/776 |
| 5,242,046 A * | 9/1993 | Bailey | 198/774.1 |
| 5,613,595 A * | 3/1997 | Ukada | 198/774.3 |
| 7,241,086 B2 | 7/2007 | Esser | |

\* cited by examiner

CONVEYOR FOR ELONGATED WORKPIECES

CROSS REFERENCE TO RELATED APPLICATIONS

This application is the US-national stage of PCT application PCT/EP2012/000504 filed 4 Feb. 2012 and claiming the priority of German patent application 102011016199.6 itself filed 6 Apr. 2011.

The invention relates to a conveyor for transporting workpieces elongated along longitudinal axes, in particular pipes and round stock, in a transport direction transverse to the longitudinal axes from a first location to a second location, the conveyor comprising: at least two stationary rests spaced apart in the transport direction for the temporary placement of the workpieces being conveyed, at least one first transport rack having a plurality of supports for the workpieces, which supports are spaced apart in the transport direction, at least two mutually parallel drive shafts that are driven synchronously, and at least two first cranks each rotationally fixed to a respective one of the drive shafts and each pivoted on the first transport rack.

This type of apparatus enables workpieces to be transversely transported flat, with multiple workpieces spaced apart parallel to and adjacent each other relative to their longitudinal axes. Transport is effected by alternate lifting and lowering in a manner analogous to that of a walking-beam conveyor simultaneously stepwise through an apparatus for machining the ends of the workpieces that are provided with chamfers and/or a thread.

The workpieces here are normally provided first, for example, with a chamfer on or in a pipe milling machine, then conveyed to a first thread-cutting machine or a machine that is fitted with tools for milling the end faces of the workpieces; the referenced machines here are spaced apart at rest points. When conveyed, the workpieces must be placed or temporarily positioned at rest points that are spaced apart in the horizontal transport direction and that can be at varying vertical levels, specifically at a lower or upper level.

A machine tool for machining a tubular or bar-shaped workpiece typically has at least one turret head that can be fitted with at least two tools, and the tubular workpiece can rotate about an axis while the turret head can be rotated about a turret axis to position a tool.

Machine tools of this type are employed to machine the outer or inner surface of tubular workpieces at their ends, i.e. the pipe end is machined. This is understood to refer generally to any rotational machining, and, in particular, to cutting inner and outer threads, or chamfering the ends or tops of the workpieces. Machines are well-known for this purpose in which the tubular workpiece is clamped in a workpiece spindle. Machining is effected by moving tools against the workpiece, multiple tools being retained by a turret head. The rotational axes of the workpiece spindle and of the turret head are parallel or at right angles to each other. It is possible in general here for the workpiece, i.e. the tubular part to be machined, to be rotated while the tools remain stationary; it is also equally possible for the tools to rotate and machine a stationary workpiece. In this latter case, the workpiece spindle rotates the workpiece only so as to allow it to come to rest in the correct position during machining. Another known approach is to operate with two turret heads that are equipped with a corresponding number of tools. In terms of the relevant prior art, reference is made here to DE 10 2004004498 [U.S. Pat. No. 7,241,086].

The feed motions between the tubular workpiece and the tools are numerically controlled here using the standard approach. To this end, it is necessary during the machining of a resting tubular workpiece for this piece to be moved into a predefined position relative to the machine before the tool feed is activated and the machining of the end of the pipe can be effected by the relevant rotating tool. An analogous situation applies if the tubular workpiece rotates and the stationary tool is moved onto the pipe.

Conveyors of the type referenced above are well known for feeding workpieces to these machine tools, in which apparatuses a beam-like rack that is moved by a crank mechanism and using its V-shaped supports transports the workpieces, which are lying flat and aligned upstream of the machine tool(s), cyclically or stepwise to the individual rest points or for machining. The rack must move to the rest points of the lower and upper vertical levels, where the angles of rotation relative to the machine tools must be greater than from the rest points of the transport path, i.e. from rest point to rest point. Despite a maximum allowable acceleration, the cycle times of a rack that is further cycled by synchronously running crank mechanisms are relatively great due to the large swivel angle.

The object of this invention is therefore to develop a conveyor of the type referenced above that enables a faster transport to be provided for the material being conveyed while respecting specified maximum accelerations, thereby achieving a shortened transport time and thus higher productivity for the equipment. In addition, it should be possible to produce the proposed conveyor by simple and cost-effective means.

The solution to this problem as attained by the invention is characterized in that the conveyor further comprises, in addition to the above-referenced elements, at least one second transport rack having at least one support for the workpieces, the second transport rack being connected by two second cranks to the drive shafts with each second crank rotationally fixed to a drive shaft and pivoted on the second transport rack, the second cranks being mounted on the respective drive shafts offset angularly by an angle relative to the respective first cranks. In terms of double racks created in this way, it is accordingly possible, depending on the pipe length, to provide multiple units having a synchronous drive of the shafts through coupling shafts in the direction of the longitudinal axis of the workpieces or pipes or round stock.

The offset angle is preferably between 40° and 80°, the value 60° having proven to be especially useful.

The two drive shafts are preferably driven by a common drive motor. The two drive shafts can be axially centrally driven by the drive motor with the first and second cranks rotationally fixed at the axial ends of the drive shafts. This results in a simple and advantageous design.

The rests can be provided at two different levels. The rests are preferably provided here in the form of V-shaped supports.

The number of supports for the workpieces of the first and second transport racks must never be identical; provision can be made whereby the number of supports of the first transport rack is greater than the number of supports for the workpieces of the second transport rack.

A thread-cutting machine can be provided at the first location and/or the second location to cut a thread in the workpieces; or a machine for chamfering or milling the workpieces can be provided.

In addition, a clamping apparatus for clamping the workpiece can be provided at the first and/or second location; this clamping apparatus can also an integral component of a machine tool.

The invention thus allows shortened transport or cycle times to be achieved, furthermore with smaller and also identical transport rotation angles in the area of the machine, as well as higher productivity—this being the result of two horizontally-spaced, vertically offset, commonly driven transport racks, with the cranks of the two racks mounted with an angular offset (of preferably 60°) on the respective drive shafts of the respective crank mechanisms.

The thus created double rack that includes one rack each on both sides of the drive shaft, which is somewhat longer as compared with a single rack, moves to both vertical levels simultaneously at maximum acceleration due to the cranks of the racks that are mounted on the drive shaft with an angular offset. The transport rotation angle that is reduced and identical for each rack, for example 240° for the first rack, and correspondingly 180° for the second rack having a 60° angular offset of the cranks, enables a reduction to be gained of at least 25% in terms of cycle times.

Embodiments are shown in the drawing. Therein:

Figure 1A:
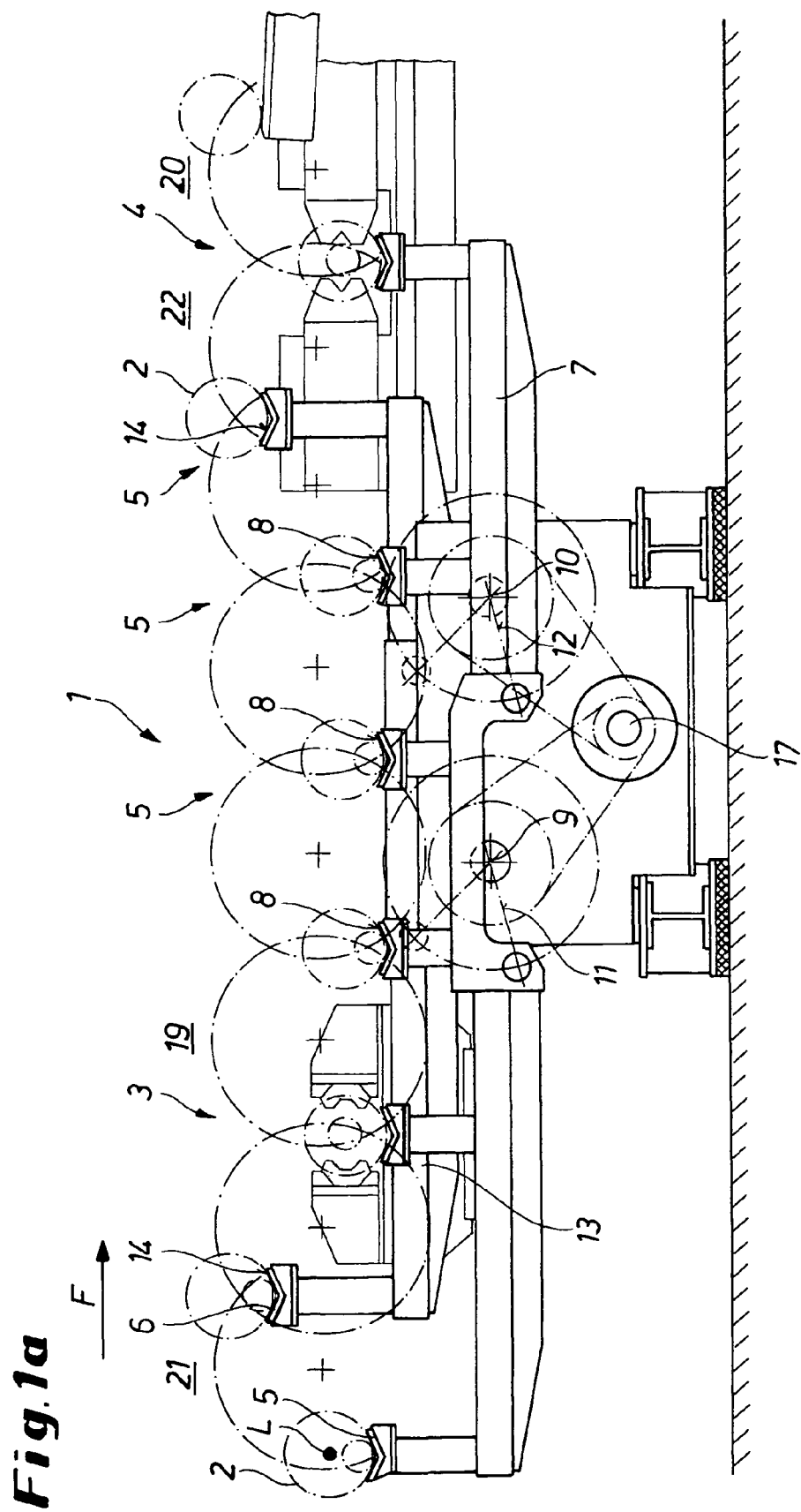
FIG. 1a is a side view of a double rack.
Figure 1B:
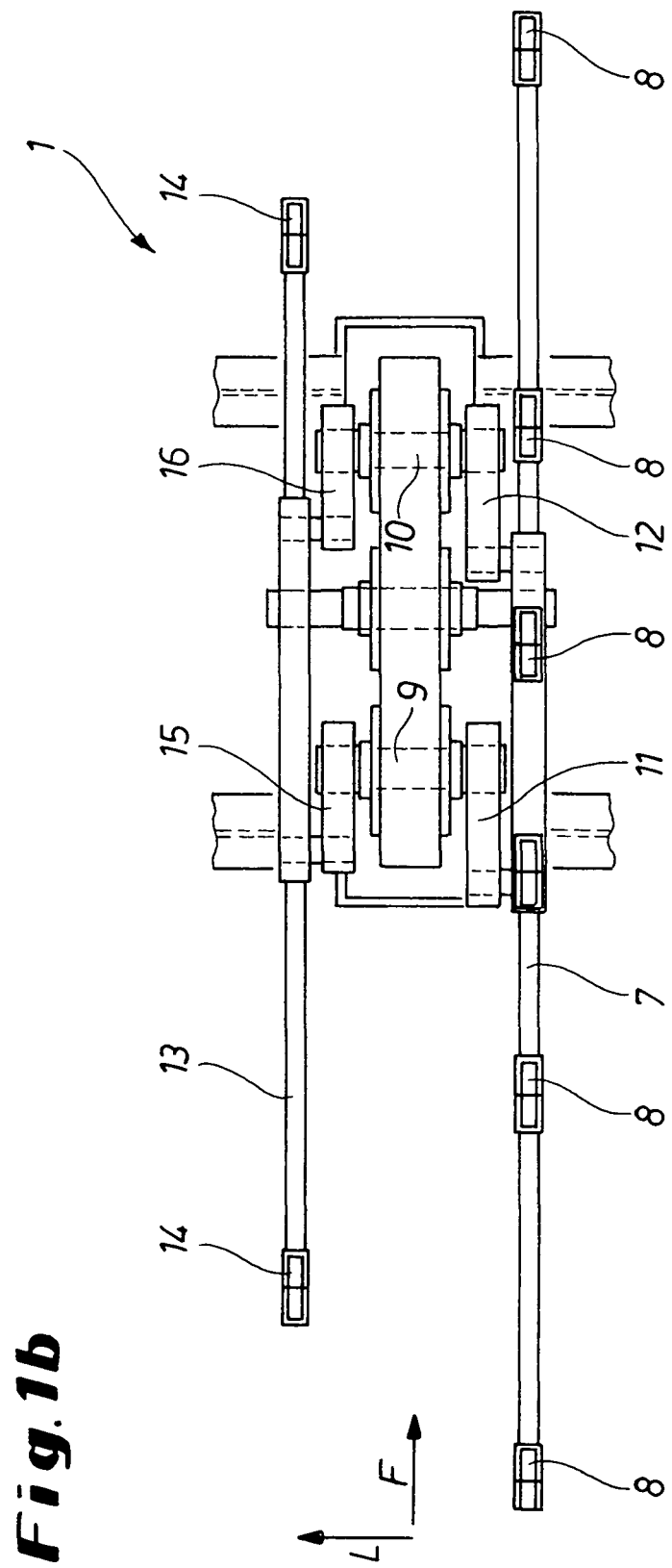
FIG. 1b is a top view.
Figure 1C:
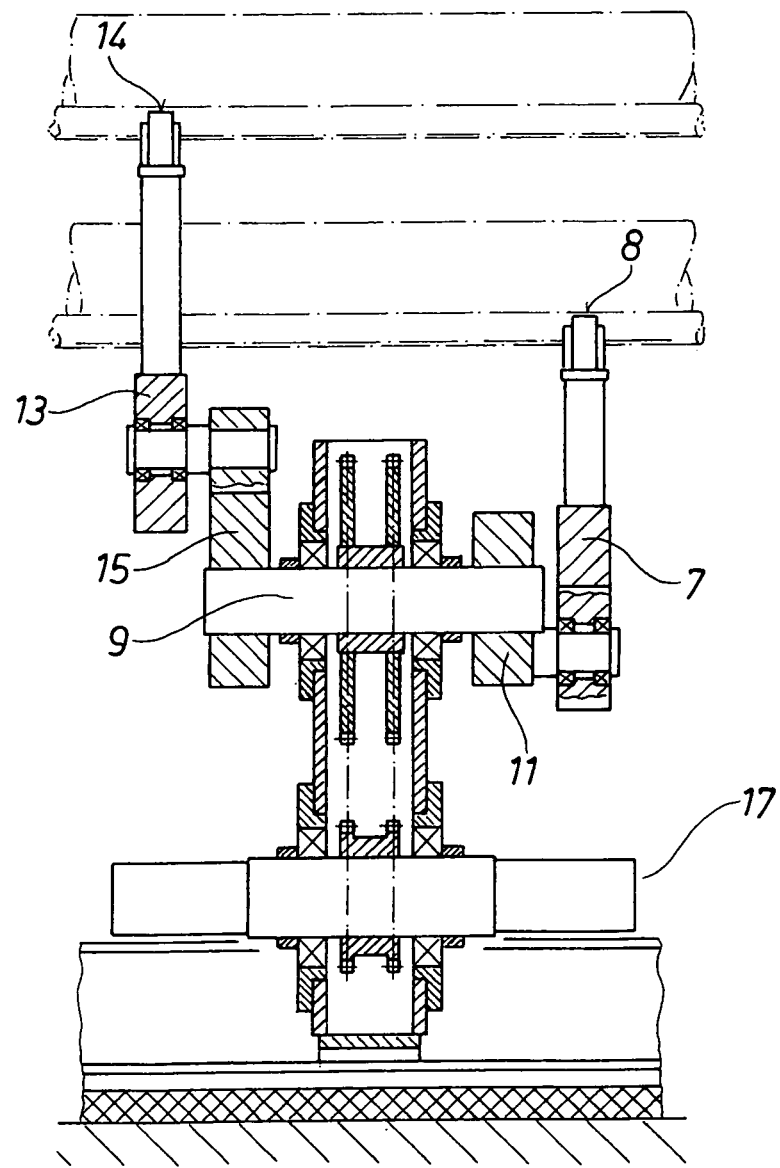
FIG. 1c is a front view of a conveyor for transporting pipes in a transport direction.

FIGS. 1a through 1c show a conveyor 1 that can transport workpieces 2 in the form of pipes in a transport direction F. The transport direction F here extends perpendicular to a longitudinal axis L of the workpieces 2.

The conveyor 1 operates like a walking-beam conveyor. To this end, the conveyor 1 includes a plurality of stationary rests 5 and 6 on which one workpiece 2 each is temporarily placed or temporarily stored during transport. It should be noted that there is at least one such conveyor 1, as shown in the figures, at each axial end of the round stock being conveyed, with both conveyors operating synchronously.

The stepped advancement from one rest 5, 6 to the rest following in the transport direction F is effected by two transport racks, specifically by a first transport rack 7 and a second transport rack 13. A single drive motor 17 is provided that synchronously drives two shafts 9 and 10 through respective drive elements (for example a chain or belt). Two cranks are rotationally fixed to each of the drive shafts 9 and 10, specifically a first crank 11 or 12 and a second crank 15 or 16 (seen best in FIG. 1b). The cranks 11, 12, 15, 16 are pivoted on the transport racks 7 or 13 at their ends opposite the respective drive shafts 9, 10. FIGS. 1b and 1c thus show, in particular, that both the racks 7, 13 are supported or mounted by their cranks 11, 12, 15, 16 on the drive shafts 9, 10.

Consequently, the synchronous rotation of drive shafts 9, by the drive motor 17 causes the cranks 11, 12, 15, 16 to rotate together with the respective drive shafts 9, 10, and move the racks 7 and 13 to effect an oscillating combined lifting and translatory motion.

V-shaped supports 8 or 14 are mounted on the tops of the transport racks 7 and 13, which surfaces are provided in the form of V-shaped supports; as seen from the side the V shape of supports 8, 14 ensures that a tubular workpiece 2 can be held securely. A workpiece 2 can thus be lifted by the transport racks 7, 13 from one stationary rest 5, 6, or its supports 8, 14, moved downstream the movement path of the racks 7, 13, and then placed on the next rest 5, 6—by the lowering motion of the racks 7, 13 and in this way advanced in the transport direction F.

A milling or chamfering machine 19, and a thread-cutting machine 20, are indicated only schematically in FIG. 1a. An alignment pusher 21 is located upstream of the machine 19. An alignment roll bed 22 is provided upstream of the thread-cutting machine 20. Multiple stationary rests (V-shaped rests) 5 are provided between the machines 19 and 20.

Figure 2:
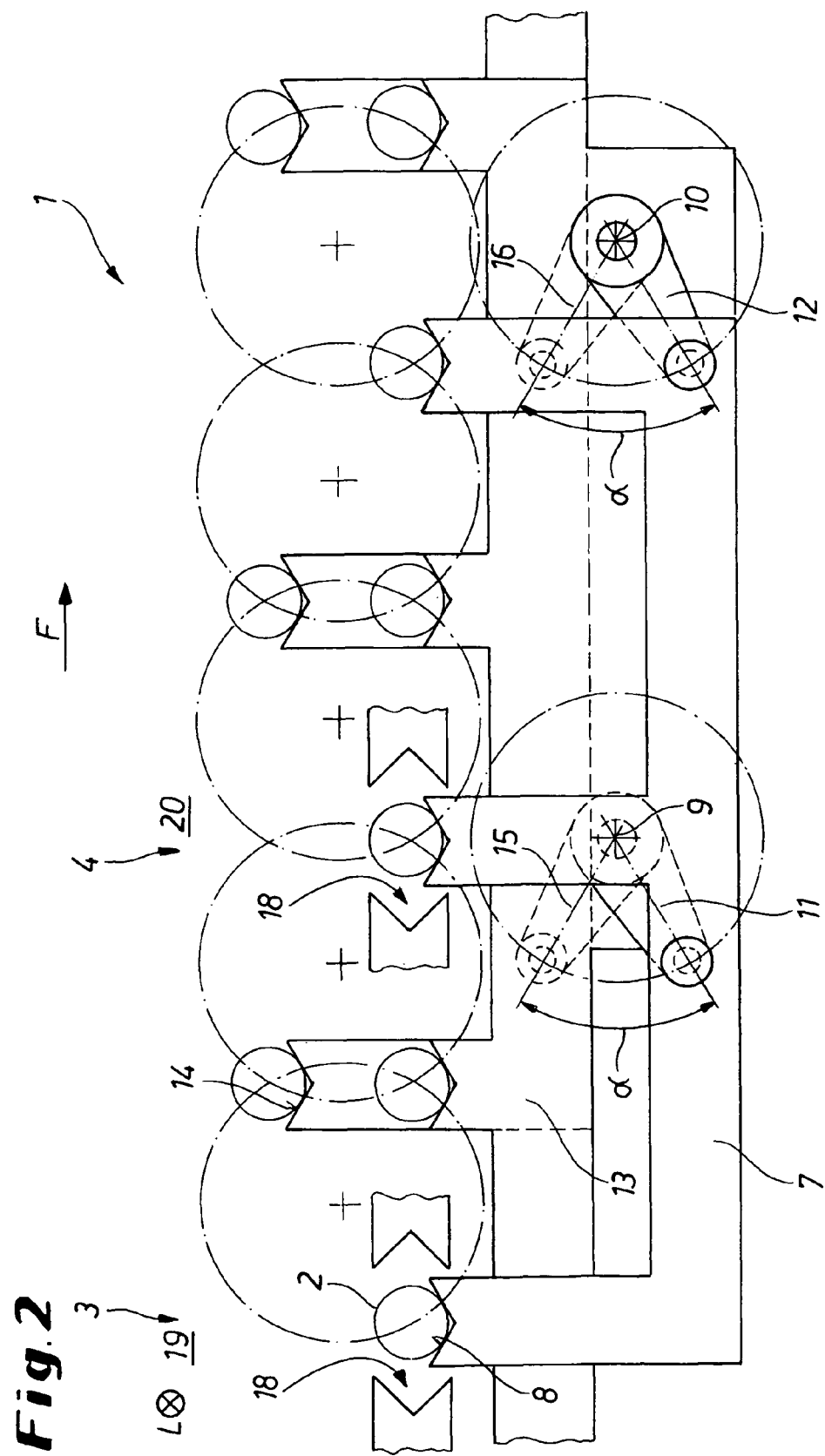
FIG. 2 is a side view of this conveyor in a somewhat modified embodiment.

The essential aspect is that the first cranks 11, 13, and the second cranks 15, 16, as shown best in FIG. 2, are mounted on each drive shaft 9, 10 offset angularly by an angle $\alpha$. This angle is 60° in the illustrated embodiment.

Accordingly, the arrangement comprising both moved transport racks 7, 13—in other words, the double racks—are not moved through a complete revolution of drive shafts 9, 10 before the V-shaped supports 8 or 14 re-engage one of the workpieces 2. Instead, the transport rack that follows by offset angle $\alpha$ advances workpieces 2 in the manner described immediately after drive shafts 9, 10 have rotated by the referenced angle. As a result, a more rapid transport of the workpieces is possible without the necessity of exceeding the allowable accelerations for the workpieces 2.

In general, the workpiece 2 is conveyed from a first location 3 to a second location 4 (see FIG. 1a or FIG. 2) such that machine tools for machining the workpieces can be provided at the two locations mentioned. To this end, a clamping apparatus 18 is indicated in FIG. 2 that can clamp the workpiece 2 for machining.

It is evident in FIG. 1 that, despite the fact that the workpieces 2 have been deposited at different levels and are to be transferred from different levels, the workpieces are nevertheless being simultaneously approached, transferred, and cyclically advanced, and also re-deposited at different levels.

In a simplified longitudinal view of a double rack, FIG. 2 shows the stepped transport of workpiece 2 from the opened clamping means of the clamping apparatus 18 of the chamfering machine or milling machine (pipe chamfering unit) 19 with temporary positioning on a higher-situated support, and then placement at a lower plane between the opened clamping means of the thread-cutting machine 20, and the following cycled advance of the workpiece 2, for example to an unillustrated roller delivery bed.

Figure 3:
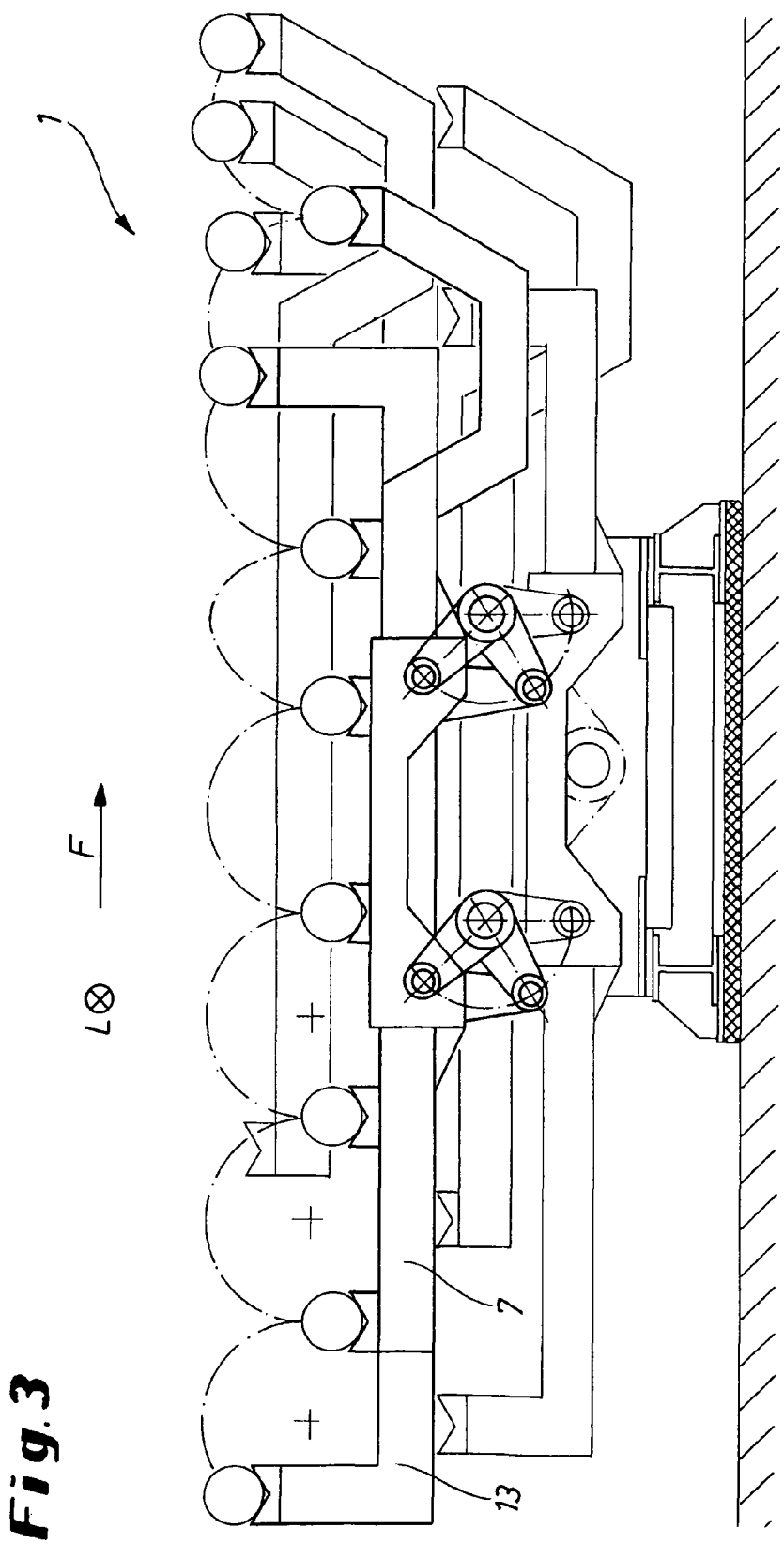
FIG. 3 is a side view of this conveyor in another somewhat modified embodiment.

FIG. 3 is a simplified diagram, similar to the previous FIG. 2, here with various intermediate positions for racks 7, 13 during a cycled transport lifting action.

LIST OF REFERENCE NUMERALS

| | |
|---|---|
| 1 | conveyor |
| 2 | workpiece |
| 3 | first location |
| 4 | second location |
| 5 | rest |
| 6 | rest |
| 7 | first transport rack |
| 8 | support |
| 9 | drive shaft |
| 10 | drive shaft |
| 11 | first crank |
| 12 | first crank |
| 13 | second transport rack |
| 14 | support |
| 15 | second crank |
| 16 | second crank |
| 17 | drive motor |
| 18 | clamping apparatus |
| 19 | milling/chamfering machine (pipe chamfering unit) |
| 20 | thread-cutting machine |

| | |
|---|---|
| 21 | alignment pusher |
| 22 | alignment roller bed |
| L | longitudinal axis |
| F | transport direction |
| α | offset angle |

The invention claimed is:

1. A conveyor for transporting workpieces elongated along longitudinal axes, in particular pipes and round stock, in a transport direction transverse to the longitudinal axes from a first location to a second location, the conveyor comprising:
- at least two stationary rests spaced apart in the transport direction for the temporary placement of the workpieces being conveyed,
- at least one first transport rack having a plurality of supports for the workpieces, which supports are spaced apart in the transport direction,
- at least two mutually parallel drive shafts that are driven synchronously, and at least two first cranks each rotationally fixed to a respective one of the drive shafts and each pivoted on the first transport rack,
- at least one second transport rack having at least one support for the workpieces, and
- second cranks connecting the second transport rack being connected to the drive shafts and being rotationally fixed to the drive shafts and pivoted on the second transport rack, the second cranks being mounted on the respective drive shafts offset angularly by an offset angle relative to the respective first cranks.

2. The conveyor according to claim 1, wherein the offset angle is between 40° and 80°.

3. The conveyor according to claim 2, wherein the offset angle is 60°.

4. The conveyor according to claim 1, wherein the two drive shafts are driven by a common drive motor.

5. The conveyor according to claim 4, wherein the two drive shafts are driven axially centrally by the drive motor, the first and second cranks being rotationally fixed at axial ends of the drive shafts.

6. The conveyor according to claim 1, wherein the rests are at two different vertical levels.

7. The conveyor according to claim 1, wherein the number of supports for the workpieces of the first transport rack is greater than the number of supports for the workpieces of the second transport rack.

8. The conveyor according to claim 1, further comprising:
- a thread-cutting machine at the first location and/or at the second location for the purpose of cutting cut a screwthread in the workpieces.

9. The conveyor according to claim 1, further comprising:
- a machine for chamfering or machining workpieces at the first location and/or at the second location.

10. The conveyor according to claim 1, further comprising:
- a clamping apparatus for clamping a workpiece at the first location and/or at the second location.

* * * * *